United States Patent [19]

Eng

[11] Patent Number: 5,175,530
[45] Date of Patent: Dec. 29, 1992

[54] NON-INTRUSIVE LIQUID FLOW DETECTION APPARATUS

[76] Inventor: Joseph W. Eng, 216-27 31st Rd., Bayside, N.Y. 11360

[21] Appl. No.: 526,025

[22] Filed: May 21, 1990

[51] Int. Cl.⁵ .............................................. G08B 21/00
[52] U.S. Cl. .................................... 340/606; 340/603; 73/861.18
[58] Field of Search ....................... 340/606, 603, 608; 73/861.18; 137/554; 116/264, 265

[56] References Cited

U.S. PATENT DOCUMENTS 3,176,513  4/1965  Kriete ............................... 73/861.18
4,905,897  3/1990  Rogers et al. ................... 340/608 X

OTHER PUBLICATIONS

*Product Engineering*, "Calibrated electronic listener hears flow and measures it" Sep. 1969.

Primary Examiner—Jin F. Ng
Assistant Examiner—Jeffery A. Hofsass
Attorney, Agent, or Firm—Levisohn, Lerner & Berger

[57] ABSTRACT

A non-intrusive liquid flow detection apparatus for detecting liquid flow in a select pipe, the flow generating a sound wave of known frequency and wavelength. The apparatus includes a pair of transducers spaced along the select pipe approximately one-half wavelength apart. In-phase transducer signals are generated for liquid flow through the select pipe, while out of phase transducer signals are generated for flow from remote pipes. Respective band-pass amplifiers receive and amplify the transducer signals passing the portion within a narrow-band corresponding to the known frequency of the flow sound waves. The amplified signals are summed to cancel out of phase signal components attributable to flow through remote pipes. Thus, high amplitude signals are generated only by fluid flow through the select pipe. The real time summed signal is compared to a time-averaged background noise signal to avoid inadvertent triggering from non-fluid flow sounds of similar sound print. When the real time signal is greater than the background signal by a prescribed amount for a pre-specified period of time a liquid flow detection signal is generated to trigger an alarm.

12 Claims, 2 Drawing Sheets

NON-INTRUSIVE LIQUID FLOW DETECTION APPARATUS

FIELD OF THE INVENTION

This invention relates to a non-intrusive apparatus for detecting fluid flow within a pipe, and more particularly, to an apparatus for detecting fluid flow by using the known sound print of a fluid flow to distinguish flow sounds from other sounds and a known phase relationship to distinguish flow within a select pipe from flow within other pipes.

BACKGROUND

Conventional fluid flow detecting devices are intrusive or non-intrusive. Intrusive devices are positioned within the pipe through which the fluid flows. For example, a turbine may be positioned within the pipe which turns in the presence of fluid flow to generate an output signal. Such intrusive detection devices include moving parts which disturb the flow and typically are expensive. Accordingly, it is an object of the invention to provide an economical flow detection apparatus which does not require moving parts.

The conventional non-intrusive fluid flow detection device measures the doppler shift of a sonar signal. Typically a transmitter is positioned on one side of a pipe while a receiver is positioned on the opposite side. When fluid flows within the pipe, the moving medium alters the frequency of the transmitted signal doppler shifting the sonar signal's frequency. Such doppler shift measuring devices are complex and expensive. Accordingly, it is an object of the invention to provide a simple inexpensive fluid flow detection apparatus.

According to the present invention acoustic principles are used to distinguish sounds generated by the flow of fluid through a select pipe from other pipes. Fluid flow is detected by two sound transducers with the transducers being positioned relative to the select pipe such that the sounds generated from the select pipe are in a known phased relationship. For example, by spacing the transducers at one half wavelength, the signals detected corresponding to the flow through the select pipe are in phase. Sounds from fluid flow in other pipes, remote fluid sounds, will travel through the pipe reaching one transducer first, then the other one half wavelength later. As a result the remote sounds are 180 degrees out of phase. Other sounds having frequencies other than the known frequency of the fluid flow are filtered out. In addition, the background noise is monitored to distinguish inadvertent background noise.

SUMMARY OF THE INVENTION

It is an object of the invention to provide a reliable, easy to use fluid flow detection apparatus.

It is another object of this invention to provide a cost effective fluid flow sensing apparatus for commercial, industrial and residential water sprinkler systems.

It is another object of this invention to provide a nonintrusive liquid flow detection apparatus which measures sound intensity of local sound sources and rejects sound intensity of remote sound sources and unwanted water pipe impulse noises.

It is another object of the invention to provide a nonintrusive liquid flow detection apparatus which detects liquid flow in a select pipe distinguishing the flow from other pipes.

These and other objects of the invention are provided by a flow detection apparatus for detecting fluid flow through a select pipe, said fluid flow generating a sound wave having a frequency within a known frequency range, comprising:

a first and a second sound transducer positioned in known relationship along the select pipe, said transducers generating respective first and second output signals in response to detected sounds, said output signals being at a known phased relationship for sounds attributable to fluid flow through said select pipe; and means for discriminating the sounds attributable to fluid flow through said select pipe from other sources of sound based upon said known phased relationship and said known frequency band.

DETAILED DESCRIPTION OF A PREFERRED EMBODIMENT OF THIS INVENTION

Figure 1:
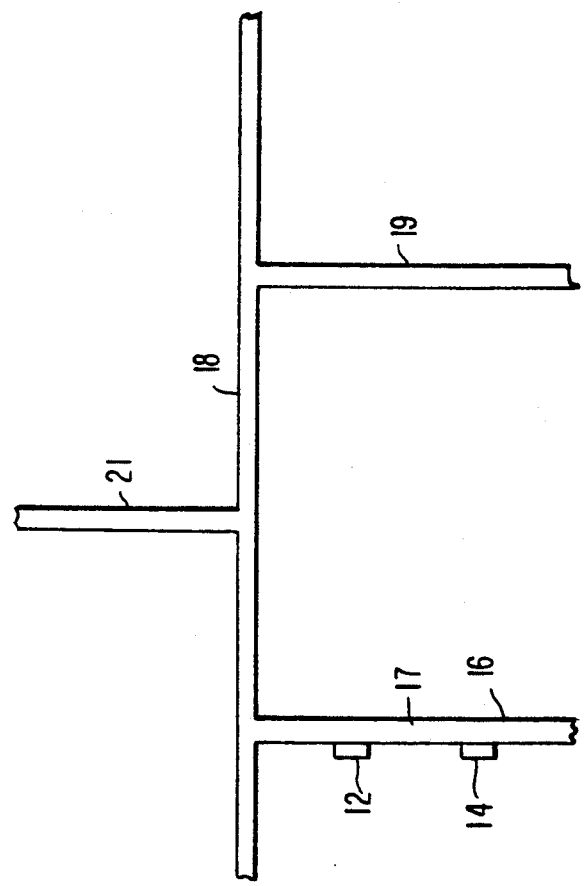
FIG. 1 is a diagram of the configuration of the nonintrusive liquid flow detection apparatus according to a preferred embodiment of this invention.
Figure 2:
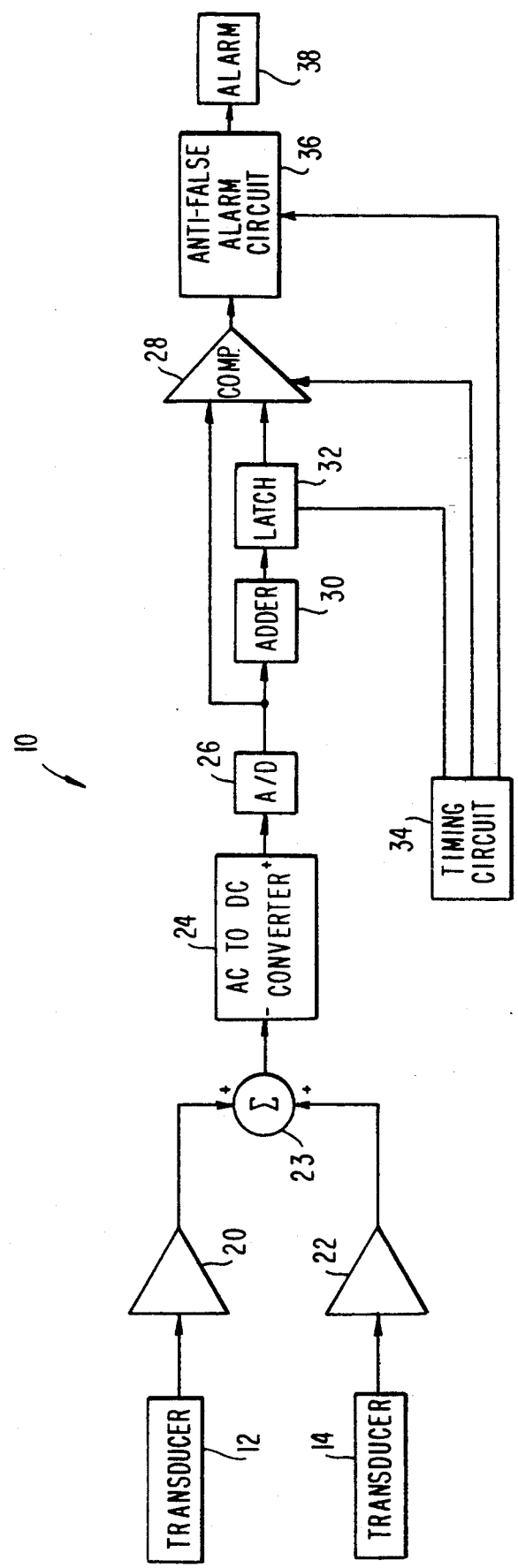
FIG. 2 is a block diagram of the non-intrusive liquid flow detection apparatus according to a preferred embodiment of this invention.

Referring to FIGS. 1 and 2, the non-intrusive liquid flow detection apparatus 10 according to a preferred embodiment of this invention is shown, including a pair of transducers 12, 14. The transducers may be microphones, piezoelectric sensors, or other acoustic sensing devices which can convert sound into an electrical signal. Referring to FIG. 1, the transducers 12, 14 are positioned along the same side of a select pipe to be monitored being spaced in known relationship to the wavelength of the sound wave generated from flow of fluid through such pipe. Such sound wave generates a known sound print in which the frequency pattern stays the same regardless of flow speed, while the amplitude decreases or increases with decreases or increases in the flow speed. Because the frequency is known, the wavelength also is known. Thus, the transducers 12 and 14 can be spaced relative to such wavelength. Preferably the transducers are spaced one-half wavelength apart along the same side of the pipe 16.

Referring to point 17 equidistant between the two transducers 12, 14 within the pipe 16, sound waves generated due to flow past such point 17 travel to the transducers 12 and 14 and are received in phase due to such equal distance. Sound waves generated from remote pipes 18, 19, 21 travel through the pipes into the select pipe 16 and are detected first by transducer 12 than one half wavelength later by transducer 14. Thus the signals at the respective transducers are 180 degrees out of phase. This phase difference is used to cancel the remote flow sound signals by summing the two transducers outputs. Thus, the apparatus 10 detects sounds at transducers 12, 14 and based on the phased relation between the sounds distinguishes the local and remote sound signals to detect liquid flow in the select pipe 16.

The sound waves detected by transducers 12 and 14 are converted into electrical signals and input to respective narrow pass-band amplifiers 20, 22. The pass-band amplifiers 20, 22 filter out background noise and undesired sounds, limiting the signal to a narrow frequency band corresponding to the known frequency of the sounds generated by the liquid flow through the pipes.

This filtered signal is amplified and output from the respective amplifier. The frequency pass-band is selected to reduce spike disturbances and attenuation of remote sound signals. The outputs from the amplifiers 20, 22 are received by a summing network 23 which adds the two signals to generate a summed signal. Summing the signals cancels out the signal portions which are out of phase with respect to the other. Thus, sounds generated by remote pipe 18 are detected by transducers 12 and 14 at a 180 degrees phase difference and thus cancel.

The summed signal, an alternate current (ac) signal, is input to an ac to dc converter 24 for conversion to a direct current (dc) summed signal. The dc summed signal then is input to an analog to digital converter 26 which converts the analog dc signal into a digital dc signal.

The digital dc signal is input to a comparator 28 and an adder 30. During initialization, sound waves are monitored over time to generate a time-averaged background noise signal. This average signal is derived from subsequent digital dc signals measured during initialization, summed by adder 30 and stored at latch 32 under the control of timing circuitry 34. During normal operation, the time-averaged background noise signal is output from latch 3 to comparator 28 and compared to the digital dc signal generated in real time.

If the real time digital dc signal is greater than the time-averaged background signal by a predetermined margin, a preliminary liquid flow detection signal is generated. To avoid false alarms the comparator output is monitored by an anti-false alarm circuit 36 which requires that the preliminary liquid flow detection signal be stable for a pre-specified period of time before a final liquid flow detection signal is generated. If stable for the required period, a liquid flow indicator alarm 38 is triggered. Thus, transient spikes will not trigger the alarm 38. The alarm may be a bell, light, coded signal or other indicator.

While a preferred embodiment of the invention has been described and illustrated, the invention is not intended to be limited to the exact embodiment. The scope of the invention is intended to be determined by the claims interpreted in light of the prior art.

I claim:

1. A flow detection apparatus for detecting fluid flow through a select pipe, said fluid flow generating a sound wave having a frequency within a frequency range, comprising:
    a first and a second sound transducer positioned along the select pipe, said transducers generating respective first and second output signals in response to detected sounds, said output signals being at a phased relationship for sounds attributable to fluid flow through said select pipe; and
    means for discriminating the sounds attributable to fluid flow through said select pipe from other sources of sound based upon said phased relationship and said frequency.

2. The apparatus of claim 1 in which said discriminating means comprises means for generating a time averaged background noise signal for comparison to a signal derived from said output signals.

3. The apparatus of claim 1 in which said discriminating means comprises filtering means for passing portions of said output signals within said frequency band.

4. The apparatus of claim 3 in which said filtering means comprises:
    a first narrow band-pass amplifier for amplifying and filtering said first transducer output signal passing the portion of said first output signal within said frequency range to generate a first filtered signal;
    a second narrow band-pass amplifier for amplifying and filtering said second transducer output signal passing the portion of said second output signal within said frequency range to generate a second filtered signal;
    means for summing said first and second filtered signals to generate a summation signal, wherein the signal portions attributable to sounds generated by non-select pipes are out of phase and cancel.

5. The apparatus of claim 4 further comprising:
    means for storing said summation signal over time during initialization to generate a time averaged background signal;
    means for comparing a current summation signal and said time-averaged background signal to generate a preliminary flow detection signal when said current summation signal is greater than said background signal.

6. The apparatus of claim 5 further comprising:
    means for monitoring the output of said comparing means to determine when said preliminary liquid detection signal is stable for a predetermined period of time, a final liquid detection signal being output when said preliminary signal is stable for said predetermined time period.

7. The apparatus of claim 1 in which said transducers are spaced along the same side of said select pipe approximately one-half wavelength apart, said wavelength being the wavelength attributable to the sound wave generated by fluid flow within the select pipe.

8. A flow detection apparatus for detecting fluid flow through a select pipe, said fluid flow generating a sound wave having a frequency within a frequency range, comprising:
    a first and a second sound transducer positioned along the select pipe, said transducers generating respective first and second output signals in response to detected sounds, said output signals being at a phased relationship for sounds attributable to fluid flow through said select pipe; and
    means for discriminating the sounds attributable to fluid flow through said select pipe from other sources of sound comprising filtering means for passing portions of said output signals within said frequency range and means for canceling portions of said output signals which are out of phase relative to said phased relationship.

9. The apparatus of claim 8 in which said transducers are spaced along the same side of said select pipe approximately one-half wavelength apart, said wavelength being the wavelength attributable to the sound wave generated by fluid flow within the select pipe.

10. The apparatus of claim 8 in which said filtering means comprises a first narrow band-pass amplifier for amplifying and filtering said first transducer output signal passing the portion of said first output signal within said frequency range to generate a first filtered signal; a second narrow band-pass amplifier for amplifying and filtering said second transducer output signal passing the portion of said second output signal within said frequency range to generate a second filtered signal; and means for summing said first and second filtered signals to generate a summation signal, wherein the signal portions attributable to sounds generated by non-select pipes are out of phase and cancel; and the apparatus further comprising means for storing said summation signal over time during initialization to generate a time averaged background signal and means for comparing a current summation signal and said time-averaged background signal to generate a preliminary flow detection signal when said current summation signal is greater than said background signal.

11. The apparatus of claim 10 further comprising:

means for monitoring the output of said comparing means to determine when said preliminary liquid detection signal is stable for a predetermined period of time, a final liquid detection signal being output when said preliminary signal is stable for said predetermined time period.

12. A flow detection apparatus for detecting fluid flow through a select pipe, said fluid flow generating a sound wave having a frequency within a frequency range, comprising:

a first and a second sound transducer positioned along the select pipe at one half wavelength apart, said wavelength being the wavelength attributable to the sound wave generated by fluid flow within the select pipe, said transducers generating respective first and second output signals in response to detected sounds, said output signals being in phase for sounds attributable to fluid flow through said select pipe; and filtering means for passing portions of said output signals within said frequency range comprising a first narrow band-pass amplifier for amplifying and filtering said first transducer output signal passing the portion of said first output signal within said frequency range to generate a first filtered signal and a second narrow band-pass amplifier for amplifying and filtering said second transducer output signal passing the portion of said second output signal within said frequency range to generate a second filtered signal;, means for summing said first and second filtered signals to generate a summation signal, wherein the signal portions attributable to sounds generated by non-select pipes are out of phase and cancel;

means for storing said summation signal over time during initialization to generate a time averaged background signal and means for comparing a current summation signal and said time-averaged background signal to generate a preliminary flow detection signal when said current summation signal is greater than said background signal; and means for monitoring the output of said comparing means to determine when said preliminary liquid detection signal is stable for a predetermined period of time, a final liquid detection signal being output when said preliminary signal is stable for said predetermined time period.

* * * * *